Nov. 25, 1958 P. J. APOL 2,861,819
PAYROLL ACCOUNTING BOARD
Filed Dec. 14, 1956 5 Sheets-Sheet 1

INVENTOR.
PETER J. APOL
BY Morgan, Finnegan, Durham & Pine
ATTORNEYS.

Nov. 25, 1958 P. J. APOL 2,861,819
PAYROLL ACCOUNTING BOARD
Filed Dec. 14, 1956 5 Sheets-Sheet 2

INVENTOR.
PETER J. APOL
BY
Morgan, Finnegan, Durham & Pine
ATTORNEYS.

Nov. 25, 1958  P. J. APOL  2,861,819
PAYROLL ACCOUNTING BOARD
Filed Dec. 14, 1956  5 Sheets-Sheet 3

INVENTOR.
PETER J. APOL
BY
Morgan, Finnegan, Durham & Pine
ATTORNEYS.

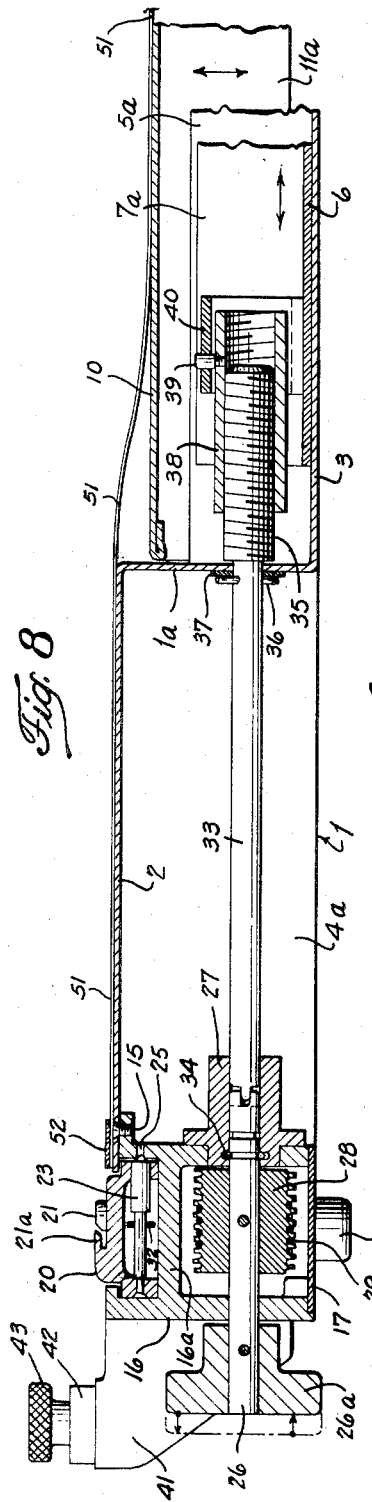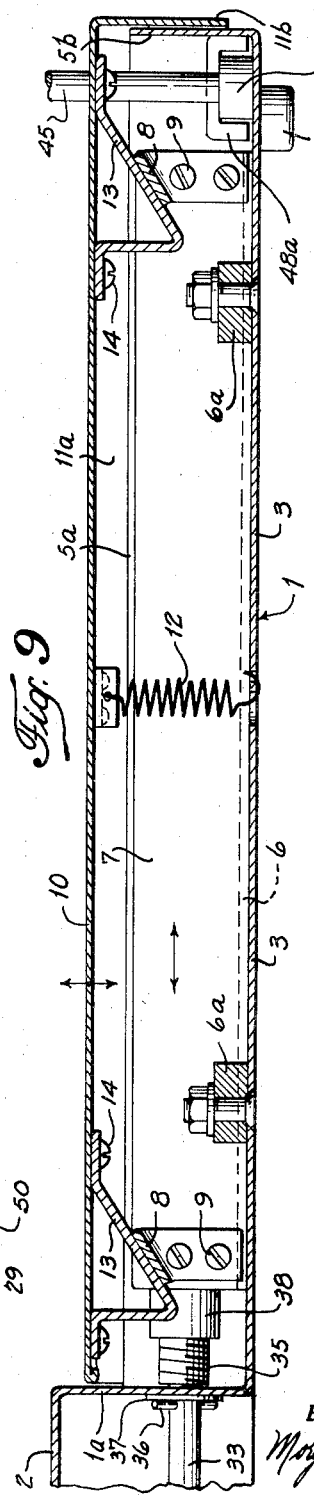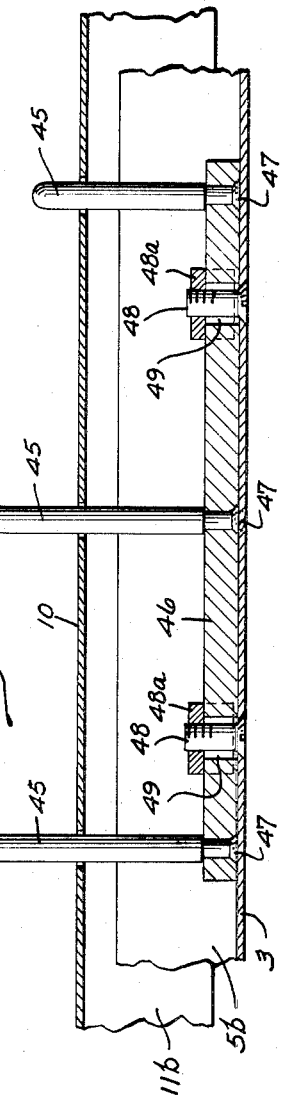

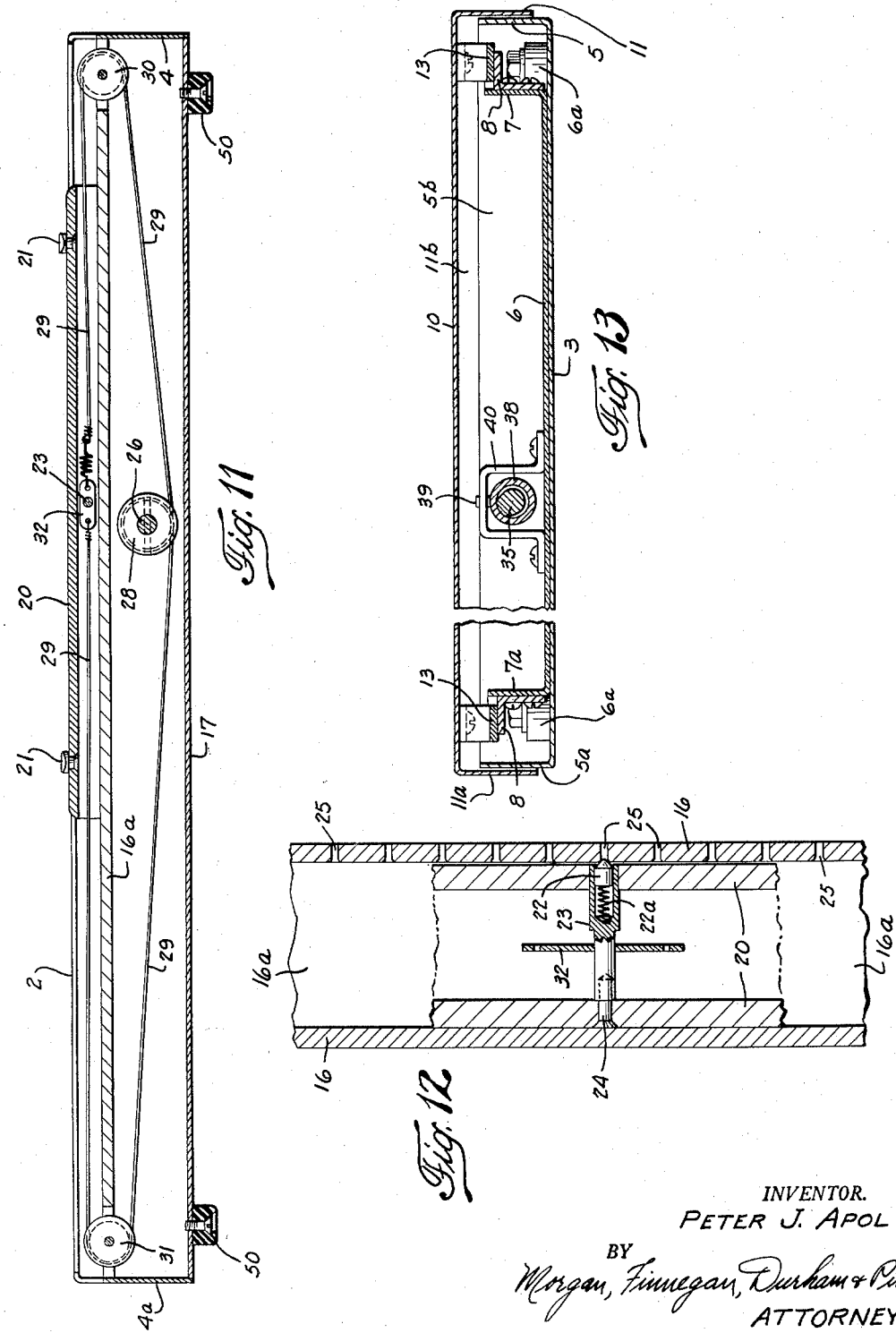

2,861,819

PAYROLL ACCOUNTING BOARD

Peter J. Apol, Westport, Conn.

Application December 14, 1956, Serial No. 628,286

8 Claims. (Cl. 282—29)

The present invention relates to a sheet entry and copying apparatus intended for use in making from an original entry other entries or records at one writing. The invention particularly relates to apparatus for systems of accounting wherein entry sheets of different length, width or shape and different stock thicknesses must be maintained. It more particularly relates to apparatus in sheet entry systems for the posting of payroll records, for example, where entries are made in a journal and in an earnings record in conjunction with the drawing of an employee's pay memorandum such as a pay slip or salary check, and duplication media is interposed between adjacent sheets such as duplicating chemicals, carbon spot or carbon paper.

Modern practices in payroll record maintenance and posting are derived largely as a result of legal requirements and various governmental administration regulations. The salary check must meet the requirements of banking regulations; cumulative entries must be prepared of the employee's salary and deductions for specified pay intervals; for accounting purposes an omnibus record should be and is customarily maintained of all salaries and deductions paid out by the employer at each pay period; and the employee must receive a written statement of his earnings and deductions, which statement is usually a stub attached to the salary check. In addition the entries made during payroll posting must be oriented to the differing linear and columnar structural characteristics of the payroll records. The mere bulkiness of the large volume of records involved has made desirable a simple and economical method of record keeping capable of fast production without equipment of intricate design beyond the skills and capacity of ordinary clerical employees.

In the present practice, a large variety of devices have been promoted for payroll posting of multiple entry sheets. Some of these do not post three entries from only one writing, or provide triplication of only portions of the original writing or require several writing lines so that repetitive writing is necessary with consequent decrease in production and increase in possibility of error. In others, removel of one or more of the sheets of entry after successive writings requires repositioning of the sheets and substantial manipulation of the parts of the device. Removal of a record also may cause bumps, ledges or interruptions in the writing surface leading to faulty duplication or to interruptions in the original writing itself. This latter difficulty is of particular importance where the record of original entry is a salary check. Still other devices lack rigid support for the writing surface so that the entry of last impression tends to be too faint for legibility. In an effort to minimize the foregoing difficulties, payroll posting devices have been designed to place one or more of the sheets of entry on the board seriatim but with these arrangements the sheets of entry must be registered by hand with each successive writing thereby lowering the production output of the device. Other attempts have resulted in placing the employee's statement of earnings and deductions beneath the other sheets of entry, but these arrangements cannot be used with salary checks because a check must receive the original writing.

The foregoing difficulties are obviated by the instant invention.

Briefly, the present invention permits the posting of entries from one writing simultaneously on three record sheets of differing lengths, widths and stock thicknesses. All of the entries are made on one writing line. Full triplication is achieved with high economical production output by persons of little skill. Salary checks can be used as the sheet of first entry and therefore receive the original writing. The records are prestacked and no additional stock need be added to the board during the posting operation. All three sheets are continuously pre-positioned with respect to each other and with respect to the writing area so that final registration during successive writings is achieved merely by a single actuation and single motion both of which are automatically indexed and controlled. A smooth continuum of rigidly supported writing surface is maintained on the most convenient place on the board of the invention without bumps or interruption in the writing line. All entry sheets are rapidly removable seriatim or in bulk with little or no manipulation of the parts of the invention.

Speaking generally, this is accomplished by providing an apparatus consisting of a board having substantially parallel side edges to form a writing space. Means at one edge of the board firmly clamp and hold a sheaf of sheets of first entry to extend transversely across the writing space to be leafed thereon one at a time. Spaced sheet holding means, preferably impaling pins, are provided to releasably hold a stack of other sheets of entry in a registered position on the writing space beneath a leafed-over sheet of first entry and with the outer side edge of each sheet of the stack closely adjacent the unclamped end of the leafed-over sheet of first entry. In addition, carrier means are provided adjacent the edge of the board at which the clamping means are located for detachably holding and longitudinally moving another sheet of entry (sheet of second entry) positioned between the stack of sheets of entry and the leafed-over sheet of first entry.

More preferably, the board has two sections mounted on a frame, an elevating platform section to rigidly support and move the stack of sheets of entry vertically and a fixed raised platform section to support at least part of the sheet of second entry. Also a drive means is provided to advance the carrier means longitudinally and to simultaneously advance the elevating platform through a distance related to the distance of advancement of the carrier. Still more preferably, the interconnected driving means is controlled by an index means. Still more preferably, the sheet guiding means are impaling pins located adjacent the elevating section to cooperate with the stack of sheets of entry to hold same in one of a series of successive and stepped positions running from the foot to the head of the elevating section.

An illustrative embodiment of the invention is shown by way of example in the drawings, in which:

Figure 8 is a section view on the line 8—8 of Figure 5;

Figure 9 is a section view on the line 9—9 of Figure 5;

Figure 10 is a section view on the line 10—10 of Figure 5;

Figure 11 is a section view on the line 11—11 of Figure 5;

Figure 12 is a section view on the line 12—12 of Figure 7; and

Figure 13 is a section view on the line 13—13 of Figure 5.

Figure 1:
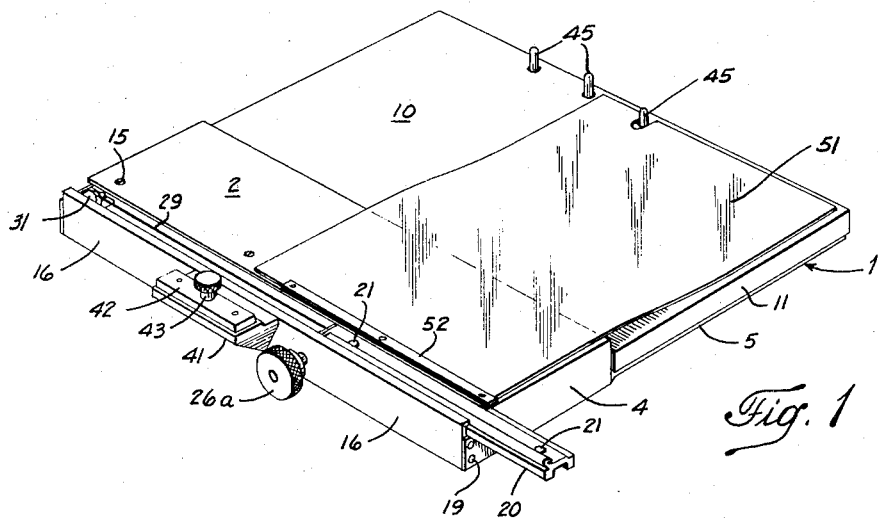
Figure 1 is a perspective view of the board of the invention prior to beginning of the posting operation.
Figure 6:
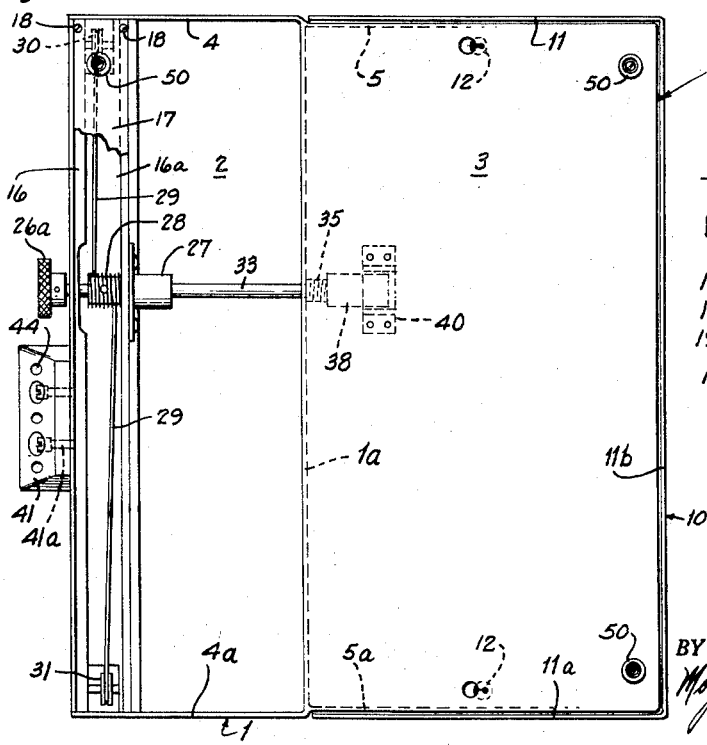
Figure 6 is a bottom plan view of the board of the invention with the board reversed head to foot.

Referring now to the illustrative embodiment of the invention shown by way of example in the drawings, the apparatus comprises a main board frame member 1 which has substantially parallel side edges forming a writing space (Fig. 1). The board is divided into two general rectangular areas by a vertical wall 1a, consisting of a horizontal raised platform section 2 on the left and a horizontal lower section 3 on the right (Figs. 1, 8 and 9). The raised section 2 has downturned vertical extensions forming sides 4, 4a at the foot and head thereof (Figs. 4 and 6) and the lower section 3 has upturned vertical extensions forming sides 5, 5a and 5b at the foot, head and right side thereof (Figs. 9 and 13).

Figure 5:
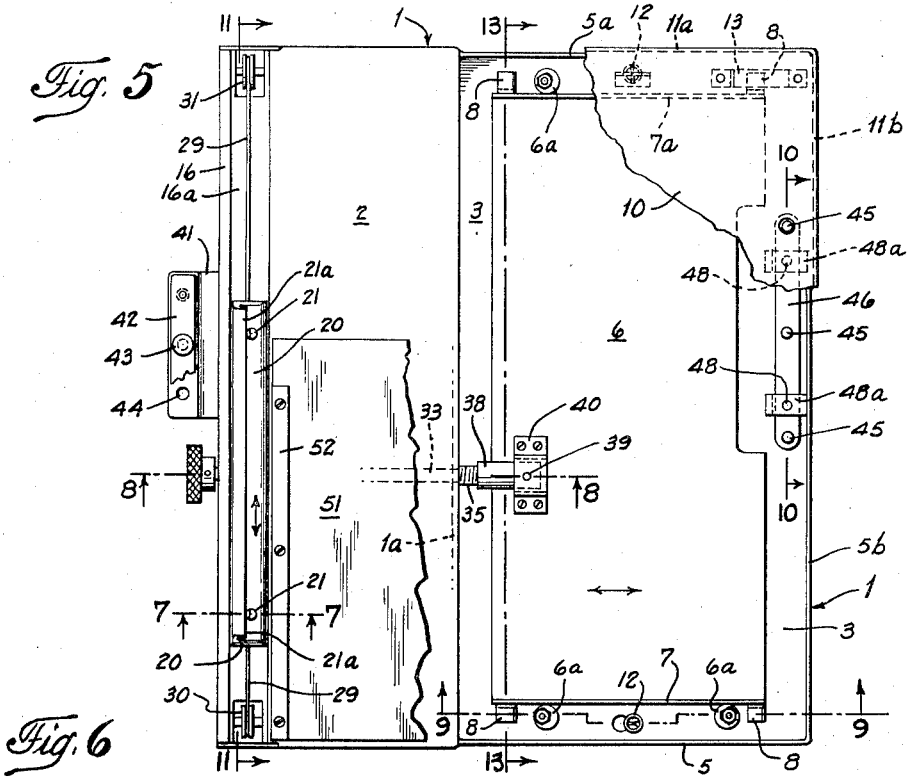
Figure 5 is a plan view of the board of the invention with portions of the upper parts broken away to expose the interior.

Resting on the lower section 3 is a rectangular link member, slide plate 6, having short upturned vertical extensions forming foot and head plates 7, 7a. Four upright slide plate cams 8, each having an upper bevel surface, are fastened by means of screws 9 to the exterior surfaces of the foot and head plates 7, 7a at the four corners of the slide plate 6 (Figs. 5, 9). Four small upright cylindrical guide plugs 6a are fastened to lower section 3 of main board member 1 by screws and nuts and lightly engage exterior surfaces of the foot and head plates 7, 7a to guide side to side movement of said sliding plate. Preferably, these plugs 6a are eccentric to permit minor adjustment.

A horizontally disposed rectangular platform, hereinafter called elevating section 10, is positioned closely adjacent raised section 2 of the main board member 1 contiguous with vertical wall 1a over lower section 3, and has downwardly turned extensions 11, 11a and 11b at its foot and head and on its exposed longitudinal (right) edge all slightly overlapping the sides 5, 5a and 5b of the main frame lower section 3 thereby being guided thereon (Figs. 9, 13). Elevating section 10 is constantly urged downwardly by two tension springs 12 anchored in lower section 3 and is rigidly supported vertically by four downwardly depending angle brackets 13 which are fastened to the under-surface of elevating section 10 by screws 14. Each angle bracket 13 has an inclined cam surface to cooperate with and ride on the beveled surface of each of the slide plate cams 8 (Fig. 9). It will be seen from the above that side to side movement of slide plate 6 in accordance with the arrows on Figs. 5, 8 and 9 causes corresponding elevation and depression advancement movement of the rigidly supported elevating section 10 and thereby causes change in position of elevating section 10 vertically with respect to raised section 2, with the upper surface of elevating section 10 always positioned in planes parallel to the plane of raised section 2.

Figure 7:
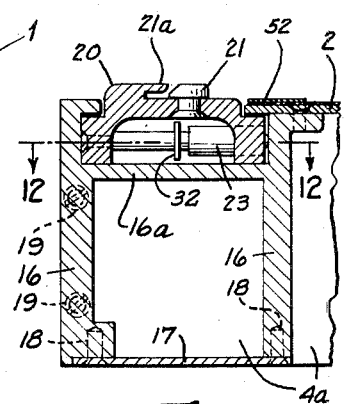
Figure 7 is a section view on the line 7—7 of Figure 5.

Fastened to raised section 2 by screws 15 and supporting its left edge from the foot to the head thereof is a carrier guide bar 16 (Fig. 7). Carrier guide bar 16 has an H section hollow web construction and is closed on its bottom by cover plate 17 with screws 18. The foot and head of carrier guide bar 16 are securely fastened to the foot and head plates 4, 4a of raised section 2 by screws 19. The web 16a of carrier guide bar 16 forms a channel track in which a linear carrier 20 slides from the foot to and from the head of the guide bar alongside the edge of raised section 2. Foot and head plates 4 and 4a have cut outs in their upper portion adjacent the carrier guide bar 16 (see Fig. 4) to permit passage of carrier 20 therethrough (see Fig. 1).

Two short upright pegs 21 are mounted and spaced longitudinally on the carrier 20 to the closely adjacent shallow lip 21a extending from foot to head of the upper surface of guide bar 20. The portion of each peg 21 closest to lip 21a is chamfered as shown in Fig 7.

A detent 22 pressed by a spring 22a is carried in hollowed out bar 23 fixed in the underside of carrier 20 by screw 24 (Figs. 7 and 12). The detent 22 is round nosed and resiliently enters and cooperates with orifices 25 spaced in the carrier guide bar 16 from the foot to the head thereof as an indexing means to index linear movement of carrier 20 at successive positions.

A stub shaft 26 extending laterally of the board is carried in the lower housing of carrier guide bar 16 below web 16a about midway of the ends thereof but slightly closer to the foot of the board. It is journaled in bearing 27 which is mounted in the wall of carrier guide bar 16. The free or outer end of stub shaft 26 fixedly carries a finger-piece 26a. A grooved drum 28 is fixed to stub shaft 26 inside the housing of carrier bar 16. Cable 29 is wound around the drum 28 and around pulleys 30, 31 fixed at the foot and head of guide bar 16 and its ends are attached to a cable plate 32 fixedly mounted on carrier bar 23.

The inner end of stub shaft 26 terminates in a female crosshead positioned within bearing 27 for cooperation with the male cross-head end of a torque shaft 33. Torque shaft 33 extends through an orifice in wall 1a of the main board member 1 into the area below elevating section 10. Stub shaft 26 is positioned longitudinally in driving relationship with torque shaft 33 by spring ring 34 which resiliently grips a corresponding radial groove in stub shaft 26 and the bearing 27. Preferably two radial grooves are provided in stub shaft 26 and the cable drum 28 has a length smaller than the recess in guide bar 16, as shown in Fig. 8, so that stub shaft 26 can be held in two longitudinal positions by spring ring 34—position engaging torque shaft 33 and another position out of engagement therewith. The end section 35 of torque shaft 33 located in the elevating section 10 portion of the device is of larger diameter than the other portion of the shaft and is left-hand screw threaded. Torque shaft 33 is longitudinally held in position by the shoulder of screw portion 35 which abuts loosely against vertical wall 1a and by a washer 37 held by insert pin 36 which loosely abuts against the opposite surface of vertical wall 1a.

A nut 38 is mounted for slight wobbling movement but fixed longitudinally by screw 39 on U-shaped anchor 40 which is fixedly carried on slide plate 6. The nut 38 is left hand screw threaded to cooperate with the threads of screw portion 35 of torque shaft 33.

Thus, the driving means for linear carrier 20 and for elevating section 10 is arranged so that movement of one is accompanied by a related and simultaneous movement of the other. Counter-clockwise rotation of finger-piece 26a, as viewed in Fig. 1, causes similar rotation of stub shaft 26 and cable drum 28 thereon to drive cable 29 to linearly advance carrier 20 from the foot to the head of the board, and, simultaneously therewith, torque shaft 33 and screw portion 35 are thereby caused to rotate counter-clockwise driving nut 38, anchor plate 40 and slide plate 6 to the right, as shown in Fig. 8, thereby raising elevating section 10 a vertical distance relative to the distance of longitudinal advancement of carrier 20. Clockwise movement of finger-piece 26a causes retraction of carrier 20 and related depression of elevating section 10 as will be understood from the foregoing.

The relation between distance of advancement or retraction of carrier 20 and distance of elevation or depression of elevating section 10 in the particular embodiment illustrated in the drawings is controlled by three factors. These are the working diameter of cable drum 28 (inner diameter of the grooves in the drum plus the cable diameter), thread pitch of screw portion 35 and nut 38, and the angle of incline of the cam surfaces of slide plate cams 8 and angle brackets 13. Various combinations of dimensions for these factors are useable for records of particular thickness and line spacing. However, as a preferred illustration of one combination which typifies use of the invention, the following example is given:

In this instance it was desired to employ documents known as earnings records having a thickness of eight thousandths of an inch (0.008) on the elevating section 10 and a document known as a journal record on the raised section 2 having lines spaced five sixteenths of an inch (5/16) part. Accordingly, the carrier guide bar 16 was constructed with the orifices 25 fixe-sixteenths of an inch apart, cable drum 28 was made with a diameter (measured to the lowermost point of the grooves) of 0.625 inch and fitted with a cable 29 of 0.025 inch diameter to provide a cable working diameter of 0.650 inch. The angle of the cam surfaces of slide plate cams 8 was made to measure 40 degrees from the horizontal and the angle of angle brackets 13 was made supplementary thereto. The threads of screw portion 35 on the torque shaft 33 and of nut 38 were made to be 3/8—16 left hand N. C. which is a left hand screw thread having an outer diameter of 3/8 inch and measuring 16 threads to the inch. With this dimensional relationship of the parts, counter-clockwise rotation of knob 26a from a position where the detent 22 was indexed in one orifice 25 to the next successive position with detent 22 in the next adjacent orifice 25 advances and indexes carrier 20 exactly 5/16 inch and simultaneously raises and indexes elevating section 10 exactly 0.008 inch.

Mounted fixedly by screws 41a adjacent the left edge of the board on the outer vertical wall of carrier guide bar 16 slightly forward of knob 26a is a holding and clamping device having a fixed section 41 and a removable section 32. Removable section 42 is mounted on and held to fixed section 41 to clamp a sheaf of documents therebetween by screw 43 which is mounted for rotational movement in removable section 42 and has a finger-piece protruding upwardly. Two pins are fixed in removable section 42 protruding downwardly to enter holes 44 in fixed section 41 and align removable section 42 thereon. The holding device is positioned so that the upper clamping surface of fixed section 41 lies in the plane of the upper surface of the carrier lip 21a and of the upper surface of chamfered pin 21. The longitudinal position of the holding device lies athwart the writing area of the board of the invention, i. e. the lateral line on which entries are to be made, so that one sheet of entry from the sheaf can be leafed over the board one at a time.

Three sheet guiding means, impaling pins 45, protrude through holes in elevating section 10 and are fixedly mounted by riveting 47 in a bar 46 which in turn rests on lower section 3 and is fastened thereon by screws 48 and brackets 48a through holes 49 in the bar 46. Holes 49 preferably are oversize and permit minor sliding adjustment in position of pins 45. Pins 45 are positioned in linear alignment from foot to head of the board and are spaced from one another to cooperate with spaced perforations in the entry sheets intended to be placed on elevating sections 10 and hold them in desired position longitudinally and laterally with respect to the desired writing area of the board. Preferably one of the pins 45 is positioned athwart the line of the board upon which entries are to be made (center pin, Fig. 10) and the pin located closer to the foot of the board is made shorter than the others to avoid interference with the hand of the operator when entries are made on this line near the right edge of the board.

For further convenience, the entrie apparatus of the invention is supported on four feet 50, made of rubber or the like. The two feet at the head of the board (not shown) may be made longer than the others or adjustable to position the entire board at an angle for ease of the operator. Also, a transparent apron 51 made of celluloid or the like is fixed to guide bar 16 by clamp 52 and overlays raised section 2 and elevating section 10 just short of the writing line to protect any entry documents thereunder from inadvertent smudging by the operator. Preferably, as shown, apron 51 has a hole or notch at its free edge to accommodate a pin 45 to permit apron 51 to extend to the outer side edge of elevating platform 10.

Figure 2:
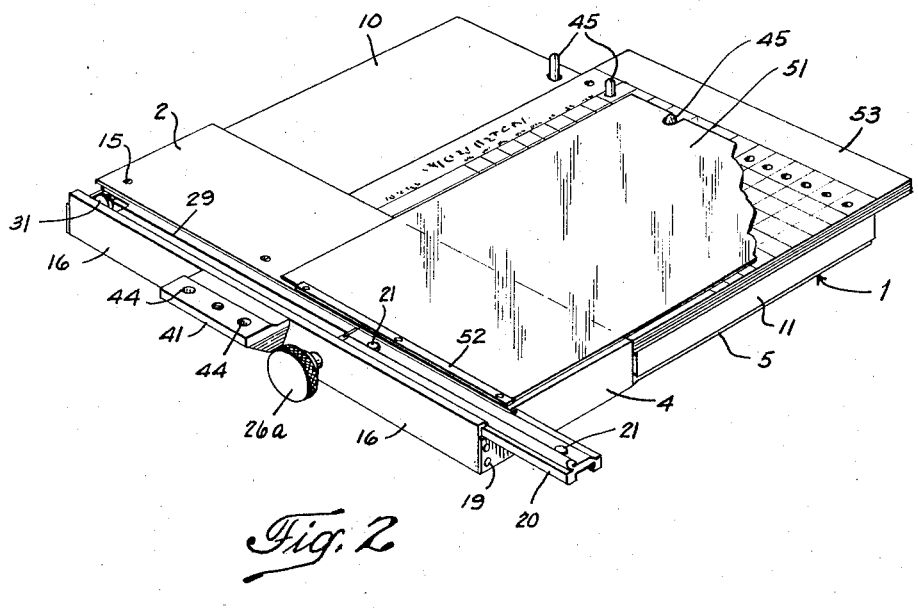
Figure 2 is similar to Figure 1 but shows a stack of earnings records in place on the board as the third sheets of entry.

In operation of the invention, a stack of third sheets of entry, e. g., earnings records 53, are placed on the elevating section 10 under apron 51 with their left edge abutting against vertical wall 1a and with their exposed right edge protruding from underneath apron 51 and slightly beyond elevating section 10 (Fig. 2). They are positioned with respect to the foot and head of elevating section 10 with their first line of entry athwart the writing line by impaling pins 45 which protrude through perforations on the right side of the earnings records. Finger piece 26a is pushed to the right of the board into the torque shaft 33 engaging position of Fig. 8 and rotated clockwise until the stack of earnings records on elevating section 10 is lowered to the point where the top earnings record 53 is flush aligned with raised section 2 (Fig. 2).

Figure 3:
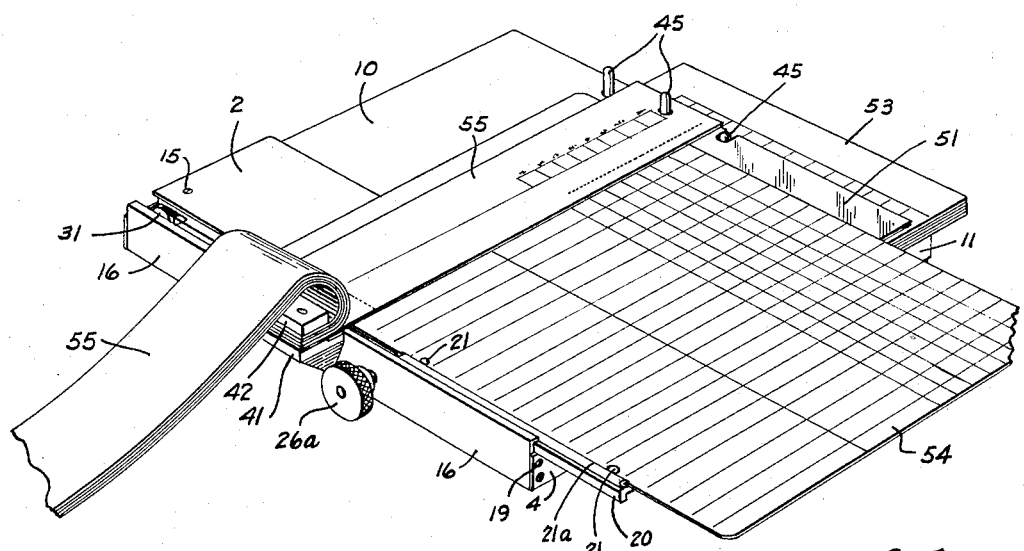
Figure 3 is similar to Figure 2 but in addition shows a journal sheet in place as the second sheet of entry and a sheaf of checks stacked for leafing onto the board seriatim as the first sheets of entry and with one of the checks finally registered thereon.

The second sheet of entry, e. g. a journal 54, is then placed on apron 51 with its left edge fitted into the slot on carrier 20 under lip 21a and with carrier pegs 21 protruding through cooperating perforations in the journal—the journal in effect resting on raised section 2 and on the topmost earnings record on elevating section 10 in one smooth continuum of writing surface. The carrier 20 positions the journal laterally with respect to the writing area. Finger piece 26a is then moved to the left (Fig. 8) to disengage from torque shaft 33 and rotated either clockwise or counter-clockwise as the case may be and the carrier 20 and the second sheet of entry 54 thereon is advanced or retracted longitudinally until the first desired line of the second sheet of entry 54 is athwart the writing line of the board and directly above the first desired line of the third sheet of entry (Fig. 3). Proper location of the perforations in these sheets of entry 54 assures that this line writing position matches an index position wherein detent 22 firmly engages an orifice 25 in guide bar 16. Finger-piece 26a is then moved to the right (as shown in Fig. 8) to engage torque-shaft 33. Minor adjustment by slight rotation of finger-piece 26a to permit keying of the drive shaft cross-heads is then made. If this minor adjustment removes detent 22 from the index position, finger-piece 26a is rotated in the opposite direction to replace detent 22 in the index position, the vertical effect on elevating platform 10 being unsubstantial and insignificant.

A sheaf of first sheets of entry, e. g. salary checks 55, are then clamped into holding device 41, 42 with the alignment pins of the removable section 42 thereof entered through accommodating slots in the checks. This positions the sheaf so that the bottommost sheet is positioned longitudinally and laterally with respect to the writing area when leafed onto the board. The checks are also provided with a perforation in their free ends to cooperate with center pin 45 to hold the check against movement under pressure of a heavy operator's hand. When a check 55 is on the pins and on the center peg, the writing or entry line of the check lies registered athwart the writing line of the board and directly above the first desired line of the second and third sheets of entry. The lowest check of the sheaf of first sheet of entry is leafed over onto the board where it assumes this position and the remainder of the sheaf folded to the left off the board (Fig. 3).

It should be understood that the first sheets of entry 55 and the second sheet of entry 54 used with the invention have duplication media impressed on their underside. Carbon treated paper and so-called NCR paper may be used. Alternatively, separate duplication media may be interposed between the first and second sheets of entry and between the second and third sheets of entry.

Figure 4:
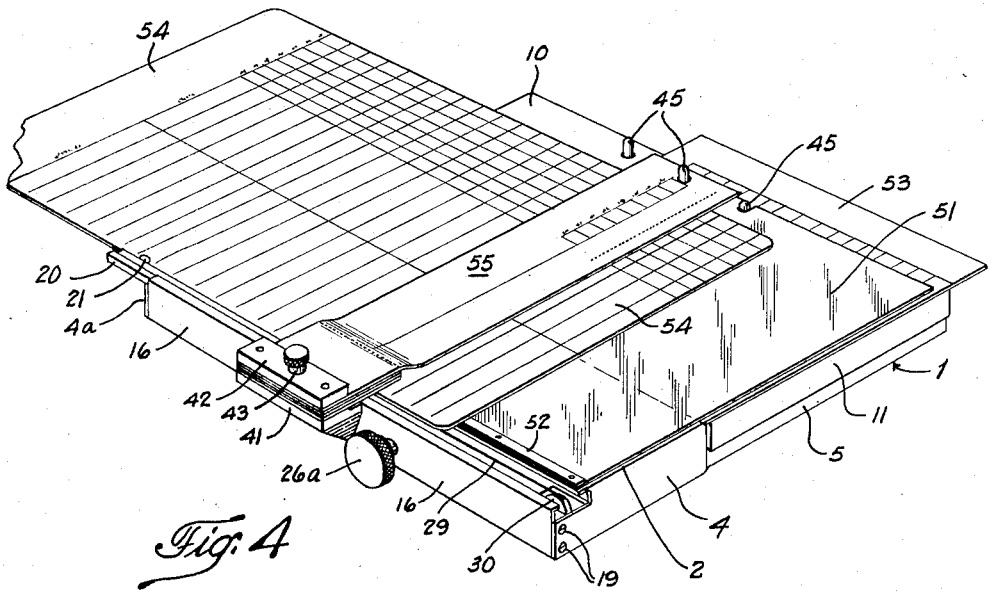
Figure 4 is similar to Figure 3 but shows the board and records after completion of the posting operation with only one third sheet of entry, a second sheet of entry and only one first sheet of entry remaining on the board.

With the foregoing arrangement of the parts and the documents, all sheets of entry are pre-positioned and stacked, and also they are in final registration for purposes of making the first line of entries. The original writing entries are then made by the operator on the writing line on the first sheet of entry. They are automatically triplicated without interruption in the second and third sheets of entry. The operator then, preferably with his right hand, raises the right edge of the check to clear the center pin 45 and tears off the first sheet of entry, check 55, to remove it from the board. Simultaneously therewith and in the same motion, the operator uses his right hand to raise the right edge of the topmost earnings record 53 to clear pins 45 and this top third sheet of entry is simultaneously removed from the board. At this stage, all of the documents awaiting entry still remain pre-positioned. Finger piece 26a is rotated counter-clockwise by the operator, preferably with his left hand and simultaneously with removal of the check and earnings record, until detent 22 reaches the next index position. This automatically advances the journal 54 to the point where the second desired line of entry thereon registers with the writing line over the third sheets of entry, and automatically elevates the stack of third sheets of entry until the topmost earnings record 53 is in flush alignment with raised section 2. At the same time, or if convenient shortly thereafter, the operator leafs the next check 55 from the bottom of the sheaf thereof onto the board. Because holding device 42 firmly grips this sheaf pre-positioned longitudinally and laterally, the motion is unidirectional. The first sheet of entry need not be adjusted from foot to head of the board or from side edge to side edge. It falls into registered position with its line of entry athwart the writing line of the board directly above the desired writing line of the sheets of entry beneath it. As a part of this unidirectional motion, however, the free end of the check 55 is placed on center pin 45 to resist movement of the check 55 under the pressure of a heavy writing hand during the making of entries. The second writing of original entries is then made, and the operation is repeated until all of the records of the stack and sheaf are entered or until the journal sheet 54 has been advanced to the head of the board (Fig. 4). New stacks or a new journal or both are then added to the board, as desired.

At the next pay period, the operation is again repeated but during initial stacking the earnings records 53 are stacked on the board advanced one line space toward the head of the board. For this purpose, the earnings records are made with perforations matching each line thereon for cooperation with pins 45.

It should be understood that the above description has been made with reference to the preferred embodiment illustrated in the drawings and that slight modification and alteration can be made therein without departing from the invention, except as expressly limited hereinafter in the claims.

I claim:

1. A sheet entry and copying apparatus having a writing area extending laterally of the apparatus between the foot and head thereof and for use in making entries on a plurality of sheets positioned thereon in superimposed relation with duplication media therebetween comprising a frame member, an elevating platform to rigidly support a stack of sheets of entry and mounted on said frame member for vertical movement to move said stacks of sheets of entry to desired vertical position, sheet guide means adjacent the elevating platform to releasably hold said stack of sheets of entry pre-positioned longitudinally and laterally with respect to the writing area, a raised platform fixed to said frame member along a side edge of said elevating platform to rigidly support at least part of another sheet of entry, a carrier to grip and hold the second-mentioned sheet of entry pre-positioned laterally with respect to the writing area over the first-mentioned stack of sheets of entry and over the raised platform and mounted on said frame member for longitudinal movement from the foot to and from the head of the apparatus to move said second-mentioned sheet of entry longitudinally with respect to the underlying stack of sheets of entry, and drive means to advance said carrier longitudinally and to simultaneously advance said elevating platform vertically through a distance related to the distance of advancement of said carrier.

2. The subject matter of claim 1 including means mounted on the frame member adjacent the driving means to coact with the driving means to index the longitudinal movement of the carrier and the vertical movement of the elevating platform to pre-determined successive positions.

3. A sheet entry and copying apparatus having a writing area extending laterally of the apparatus between the foot and head thereof and for use in making entries on a plurality of sheets positioned thereon in superimposed relation with duplication media therebetween comprising a frame member, an elevating platform to rigidly support a stack of sheets of entry and mounted on said frame member for vertical movement to move said stack of sheets of entry to desired vertical position, spaced impaling pins mounted on said frame member adjacent a side edge of said elevating platform to receive and releasably hold said stack of sheets of entry pre-positioned longitudinally and laterally with respect to the writing area by engagement with perforations in said sheets, a raised platform fixed to said frame member along the other side edge of said elevating platform to rigidly support at least part of another sheet of entry, a carrier to grip and hold the second-mentioned sheet of entry prepositioned laterally with respect to the writing area over the first-mentioned stack of sheets of entry and over the raised platform and mounted on said frame member for longitudinal movement from the foot to and from the head of the apparatus to move said second-mentioned sheet of entry longitudinally with respect to the underlying stack of sheets of entry, drive means to advance said carrier longitudinally and to simultaneously advance said elevating platform vertically through a distance related to the distance of advancement of said carrier.

4. The subject matter of claim 1 characterized by the fact that the carrier is mounted at the outer side edge of the raised platform and including means at the same side edge to firmly clamp and hold a sheaf of other sheets of entry prepositioned longitudinally and laterally to extend transversely across the raised platform and the elevating platform above and registered with the first-mentioned stack of sheets of entry and the second-mentioned sheet of entry and to be leafed thereover one at a time.

5. The subject matter of claim 4 characterized by the fact that the clamping means for the sheaf of sheets of entry is mounted on the frame member adjacent the left side edge of the raised platform and the carrier is also mounted adjacent the left side edge of the raised platform but between said clamping means and the raised platform.

6. The subject matter of claim 1 wherein the driving means consists of a manually operable finger piece, a first shaft keyed to the finger piece and mounted on the frame member for rotational movement, a drum mounted on said first shaft for rotation therewith, a cable connecting the drum to the carrier for linear movement of the carrier in response to rotational movement of the drum, a second shaft engageable with the first shaft for conjoint rotation therewith, a cam member, a link member connected to said cam member and cooperating with said second shaft for translating rotational movement of said shaft into sliding movement of the cam member, a second cam member connected to said elevating platform and adapted to cooperate with the first cam member to translate the sliding movement of the cam member into vertical movement of the elevating platform.

7. The subject matter of claim 6 characterized by the fact that the first shaft is mounted for movement on said frame member into and out of position in engagement with the second shaft by movement of the finger piece.

8. The subject matter of claim 1 including a flexible apron mounted adjacent the first-mentioned edge to extend transversely across the writing space between the last-mentioned sheet of entry and said stack of sheets of entry in that portion of the writing space excluding the area of the writing space upon which entries are made.

References Cited in the file of this patent

UNITED STATES PATENTS

| | | |
|---|---|---|
| 2,435,684 | Jones | Feb. 10, 1948 |
| 2,439,537 | Zalkind | Apr. 13, 1948 |
| 2,494,142 | Pfeiffer et al. | Jan. 10, 1950 |
| 2,623,762 | Nelson | Dec. 30, 1952 |
| 2,648,547 | Bickel | Aug. 11, 1953 |

FOREIGN PATENTS

| | | |
|---|---|---|
| 701,658 | Germany | Jan. 21, 1941 |